Jan. 25, 1927.

A. F. MOYER 1,615,339

COMPUTING INSTRUMENT FOR BALANCE CORRECTIONS

Filed May 5, 1924

Inventor
Amos F. Moyer
By Paul Paul & Moore
Attorneys

Patented Jan. 25, 1927.

1,615,339

UNITED STATES PATENT OFFICE.

AMOS F. MOYER, OF MINNEAPOLIS, MINNESOTA, ASSIGNOR TO PRECISION BALANCING MACHINE COMPANY, OF MINNEAPOLIS, MINNESOTA, A CORPORATION OF MINNESOTA.

COMPUTING INSTRUMENT FOR BALANCE CORRECTIONS.

Application filed May 5, 1924. Serial No. 711,111.

In the balancing of duplicate rotative articles of manufacture, such, for example, as automobile crankshafts, the application of balancing corrections, either by the addition or removal of metal upon the work, is usually most expeditiously done at certain previously selected points having fixed angular and radial positions, two of which are employed in a transverse plane, and the relative amount of metal to be added or removed is gaged for each of said points so as to produce a resultant equal to the magnitude and angular position of the required correction quantity as measured by a suitable balancing machine or apparatus.

As the determinations by the balancing machine are usually in ounce-inches (or other unit) measured at a longitudinal lever arm which differs from the longitudinal lever arm of the correction applied to or removed from the work, and since the density of the particular kind of metal is involved in combination with its radial position and dimension of volume, it follows that an instrument showing quickly the relation between balancing machine readings and thickness or depth of metal involved, in two components, will be of great assistance to the balancing operator. Such an instrument is provided by my invention here described.

The essential functions of the instrument in making this computation are: first, to resolve the balancing machine reading into components at the required angular positions, and, second, to express each of these components in terms of the dimension of metal involved.

The resolution of a quantity into angular components is commonly done graphically by laying off to scale the quantity as a vector from the vertex, and in correct relative position within the angle of resolution, and by striking parallels to the opposite sides through the extremity of the vector. The scaled lengths of the intercepts on the sides of the component angle then represent the component quantities giving a combined effect equal to that of the vector.

Figure 2:
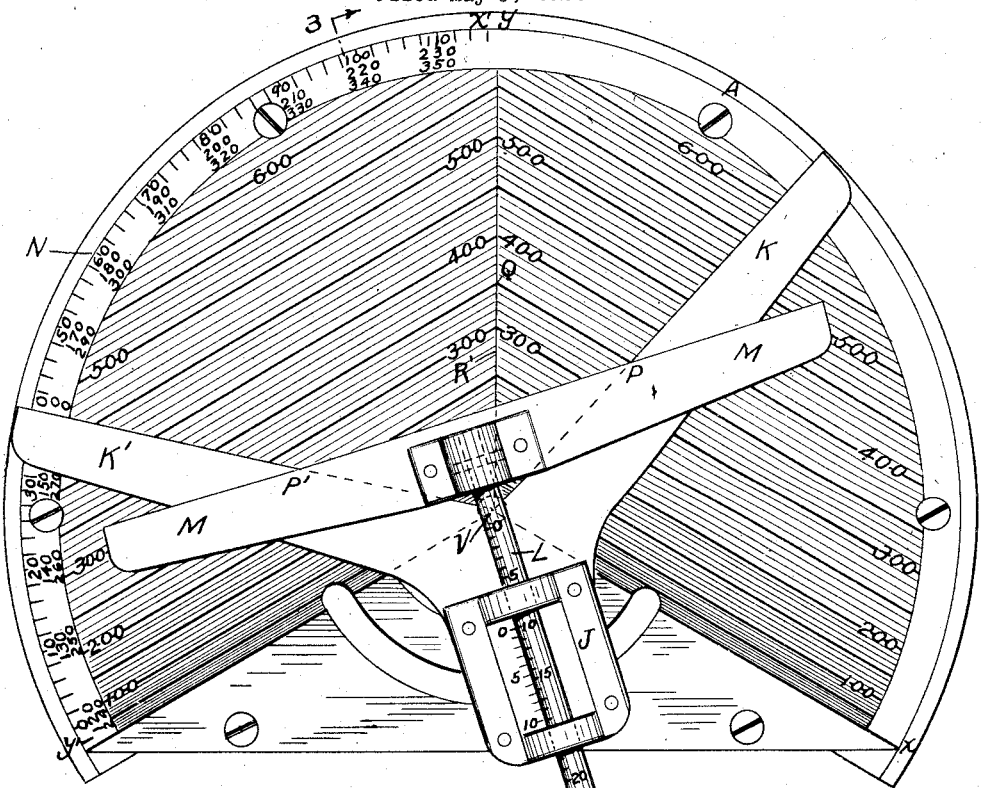
Figure 3:
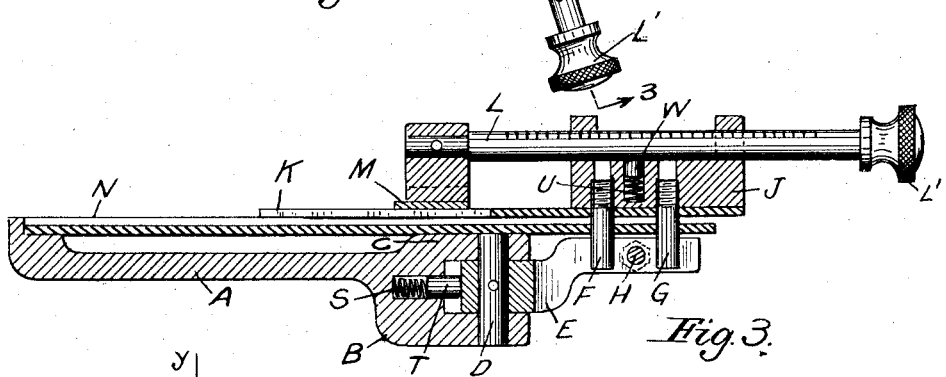
Figure 1:
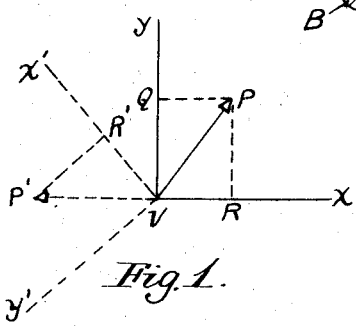

Figure 1 is a geometric outline illustrating the principle of the instrument. Figure 2 is a face view of the computing instrument with non-uniform parallel rulings established for the balancing of a six cylinder automobile crankshaft, where balancing corrections are made by a machine tool which removes determinate thicknesses of metal in accordance with the numerical legend referring to the parallel lines. Figure 3 is a sectional view on line 3—3 of Figure 2, and showing the mechanical construction of the instrument. In the several views like characters designate identical parts or similar positions.

Figure 1 illustrates this geometric construction, where the line VP represents the magnitude and direction of the quantity determined as required to balance the body, while the positions V$x$ and V$y$ represent respectively the desired points upon the body at which corrections are to be applied of such respective magnitudes as will combine as the equivalent of the quantity VP. If the line PQ is taken parallel to V$x$ and the line PR parallel to V$y$, the length of the lines VR and VQ, respectively, represent the magnitudes of the quantities required in the positions V$x$ and V$y$ to constitute the equivalent of the quantity VP. If the area lying between the lines V$x$ and V$y$ were ruled with lines parallel to the line V$x$, the equivalent of distance VQ could be readily read between these lines, from the location of point P. By means of such parallel rulings spaced according to a non-uniform scale showing increments in metal thickness removed from or added to the work, equivalent to a uniform scale of quantities of balance, the thickness of metal required for the correction in position V$y$, which is the value of VQ as read between such parallels from the point P, is readily determined. The non-uniformity of the said scale for parallel lines showing increments of metal thickness removed from or added to the work, equivalent to a uniform scale of quantities of balance, will depend on the contour of the work at the point where the correction is to be made, and the shape of surface formed by the cutting tool employed in making a correction of the determined thickness. Such a scale is established experimentally by making the equivalent of corrections with increments in thickness upon a previously balanced body, and measuring the corresponding change in balance.

Similar rulings parallel to the line V$y$ might also be employed to read the thickness of metal required for the correction represented by the length VR in the position of line V$x$, save for confusion arising from rulings in two directions, one of which may correspond to a different contour and radial position than the other, and confusion in instances where the angle $xvy$ is other than ninety degrees. To avoid these sources of confusion, the angle $x'vy'$ may be taken equal to the angle $xvy$, and the vector VP' equal to the vector VP, and of the same relative angular position between lines V$x'$ and V$y'$ as has the vector VP between the lines V$x$ and V$y$. The angle PVP' will then be equal to the angle $xvx'$ and equal to the angle $yvy'$. Then taking P' R' parallel to V$y'$, the distance VR' is equal to the distance VR. Likewise non-uniform rulings parallel to the line V$y'$ may be established to read from the point P' the metal thickness to be removed from or added to the work at the angular position of the line V$x$.

The mechanical construction as seen in Figure 3 and Figure 2 is as follows: A back plate A carries arms B and C in which are formed bearings for shaft D. Fixed to shaft D is arm E in which are clamped pins F and G by means of screw H. Pins F and G are in turn secured in guide J to which are fixed blades K and K'. Slidably engaged in guide J is rod L which carries blade M. Pins F and G pass through segmental slots in dial plate N, so that as arm E is made to swivel upon the axis of shaft D, guide J including blades K, K' and M will assume various angular positions before dial face N, such that the lines V$y$ and V$x$ are limiting positions for blade K in its pivotal movement about the axis of shaft D. The straight line edges of blades K and K' intersect at point V, which is also the axis of shaft D and the pivotal center for guide J and blades K, K' and M. In order that these parts may be readily retained in any desired angular position, a portion of the hub of arm E is made of circular form about the center of shaft D, and spring S applies friction through button T guided in arm B, as seen in Figure 3. In similar manner, slidable rod L is retained in any desired position through friction applied by spring U and button W. Handle L' is provided for adjusting the relatively movable parts.

Just as, in Figure 1, the vector VP represents the amount of unbalance, and vector VP' is of equal length and displaced therefrom by a fixed arbitrary angle, so in Figure 2 the points P and P' at the intersection of the straight line edges of blades M, K and K' are made equidistant from vertex V by virtue of equal angular positions of blades K and K' with reference to the straight edge of the element M. The linear distance of points P and P' from vertex V is variable by sliding rod L in guide J, and graduations upon rod L reading in combination with other graduations upon guide J, adjacent thereto, afford vernier readings of this distance in accordance with quantities of unbalance which have been determined as applicable to the work. When graduation O on rod L is in line with graduation O on guide J, the straight line of the edge of blade M passes through vertex V. The length of the scale on guide J is divided in ten equal parts, the sum of which is equal to nine divisions of the scale on rod L, thus affording readings to one-tenth of the smallest divisions on the rod L.

Although in Fig. 1 the angles $xvy$ and $x'vy'$ have been drawn as ninety degrees the actual value of this angle is necessarily equal to the angular distance upon the work between the desired points of correction.

In Figure 2, the angle between blades K and K' is one-hundred and twenty degrees, and the angle $xvy$, equal to $x'vy'$, is of like magnitude, such as would be required for determining component corrections at two of three equal circular divisions, such, for example, as might be best adapted to a conventional six cylinder automobile crankshaft. For other angular spacing of corrections, the angles $xvy$ and $x'vy'$, as ruled upon the dial face N, will be established accordingly, according to the geometric construction of Figure 1.

Since in Figure 2, the angle $x'vy'$ designates any third of the complete circle, three sets of angular values referring to the position of blade K' are designated, any angular position determined being always measured from a fixed point on the work with reference to one of the positions of correction. Also in Figure 2, the similar parallel rulings in the two fields at the right and left sides from the center of dial N represent a condition where corrections are similarly applied at any of the three angular divisions, all of which have the same contour of surface and permit the removal of metal at the same radius and by the same form and operation of cutting tool. This form of dial ruling is also applicable where corrections are similarly applied at two of the three angular divisions, and the work is purposely produced in such an approximate state of unbalance as to eliminate the third angular division as a point of correction. In case one of the points of component correction has a different contour of surface or different radial dimension, or requires a different form of cutting tool, from the others, one portion of the field on dial N will have a differently spaced ruling from the other, and the angular graduations will be so numbered as to properly delineate the respective dimensions of metal required for the component corrections. This will frequently occur in cases where corrections are displaced ninety degrees from each other, as for example, in balancing four cylinder automobile crankshafts, where metal may be removed from the end of a long arm of the shaft, or from the side to produce a result at right angles to the end; the latter radius of correction being smaller and the surface possibly larger than the former.

The method of operation of the instrument is as follows:

The operator of the balancing machine, having arrived at a single value and position of the required correction, for example, ten ounce inches at angular position forty degrees as measured by the balancing machine, desires to mark the work, for example a six cylinder crankshaft, so that a machine tool operator will know the correct thickness of metal to remove from each of two fixed points lying one on each side of the determined position. By means of handle L', rod L is moved in guide J until graduation 10 on rod L lines with graduation O on guide J. Blade M carried on rod L then intersects blades K and K' at points P and P' equally spaced from vertex V by a distance of fixed relation to the vernier reading on rod L here taken as 10. Also by means of handle L', guide J which carries the entire blade assembly K, K' and M upon arm E is pivotally moved about the axis of shaft D, coinciding with the vertex V until the extremity of blade K' registers with the required angular graduation, for example, 40 degrees, marked upon the periphery of dial N. In this position of blade K', the relative intercepts of the points P and P' properly evaluate in their intercepts upon the parallel rulings the respective thicknesses of metal to be removed from the fixed points, for example, the ends of adjacent crank arms lying at either side of the determined position. In the example, a cut of 350 as set off by the screw on the machine tool is to be taken from the end of one crank arm and 245 from the end of the adjoining crank arm.

The movements of the operator are but two. First, to set the correct amount of the balancing machine reading on the vernier LJ, and second, to set the corresponding angular value by blade K' at the periphery of dial N. Thereupon, the readings taken from points P and P' are marked at the respective points on the work, for the guidance of the machine tool operator in the subsequent operation of removing or adding metal.

It will be seen that the practical applicability of this instrument is in cases where the number of duplicate parts to be balanced is sufficient to warrant the preparation of a specially ruled dial face based on experimental application of the form of cutting tool to be used, and that a large variety of cases are possible with proper geometric analysis, the workman thereafter being relieved from tedious computations, yet obtaining precise results without the inaccuracy of estimating.

All devices heretofore used for mechanically resolving quantities into component values, have employed two coordinates of position in a common or single field of the chart or diagram. In such devices the two components sought, must then be read by reference to scales marked on the respective axes of the diagram, which relate to the common field, or by reference to parallel rulings, which cross the field in two directions. The employment of parallel rulings has the advantage of permitting direct readings even though the axis may be at a considerable distance from the value for which readings are being taken. But when such rulings intersect one another confusion may result, due to such intersections, because it becomes difficult to read the scale corresponding to either set of intersecting lines. There is, therefore, great advantage in the method herein disclosed of employing two equivalent vectors, simultaneously adjustable, with each lying in a separate field and having but one set of rulings. Each then designates a separate component or coordinate which equals the initial quantity when combined with the other, and each is easily read in accordance with its individual scale of parallel rulings, without confusion and without reference to the other scale.

I claim as my invention:

1. The process of correcting rotative bodies for known states of unbalance determined by balancing machine readings, which consists in experimentally establishing the relation between balancing machine readings of unbalance and material dimension added or removed at selected points on the work, resolving the balancing machine reading into angular components respectively at two of said selected points, and evaluating from said experimentally established relation the material dimensions respectively to be added or removed at said two selected points, to produce balance.

2. A device of the class described comprising a chart divided by a system of rulings into two fields and arranged to permit reading of a component quantity for each of two vectors at any angular position, and a sweep having angularly related arms and pivoted at the center of the system, and having slidable means thereon for setting a known radius vector in two directions from the pivotal center of the sweep.

3. A device of the class described including rulings arranged to permit the reading of a component quantity at two angular positions, and graduated to designate uni-dimensional corrections in material required to produce balance equivalents to a predetermined multi-dimensional value, and a sweep comprising two angularly related arms having edges meeting at the pivotal center of the sweep, said sweep having thereon means slidable and cooperable with the arms for obtaining a known radius vector, in two directions from the pivot to its center.

4. A device of the class described comprising a system of rulings from which may be obtained the reading of a component quantity for each of two vectors at any angular position, a sweep pivoted at the center of the system, and having angularly related straight edges intersecting that center, said sweep having means adjustable radially and diametrically of said pivotal center simultaneously and cooperable with the straight edges, for indicating by intersection therewith, a known radius vector in two directions, from the pivotal center of the sweep.

5. A device of the class described comprising a system of rulings from which may be obtained the reading of a component quantity of each of two vectors at any angular position, a pivoted carriage having its pivotal axis at the center of the system, a rod arranged to slide radially and diametrically with relation to the pivotal axis rod having graduations, and also having a straight edge cooperable with corresponding angularly related edges of the sweep for simultaneously indicating a known radius vector in two directions, from the pivotal center of the sweep.

6. A device of the class described including rulings adapted to obtain the reading of a component quantity for each of two vectors at any angular position, and graduated to designate uni-dimensional corrections in material required to produce balance equivalents, to predetermine multi-dimensional value, a sweep adapted to swing above the rulings and having two angularly related straight edges meeting substantially at the pivotal center of the sweep, and a rod slidable upon the sweep, radially of the axis of rotation of the sweep, and having a straight edge perpendicular to its axis and cooperable with the edges of the sweep for indicating a known radius vector in two directions at points equidistant from the pivotal center of the sweep and from the center of system of rulings.

7. A device of the class described comprising a table adapted to receive a bi-lateral system of rulings, a pivoted carriage having its pivotal axis at the center of the system of rulings and carrying a sweep having angularly related straight edges intersecting at the pivotal center of the carriage, a rod slidingly arranged upon the sweep and adapted to bisect the angle between the straight edges and arranged for radial and diametrical relation to the pivotal axis of the carriage, said rod being graduated and having a straight edge attached thereto, said straight edge adapted to simultaneously intersect the edges of the sweep, at points equidistant from pivotal center.

8. A chart for the purpose described, divided by a system of rulings into two fields and arranged to permit reading of a component quantity for each of two vectors at any angular position.

In witness whereof, I have hereunto set my hand this 1st day of May, 1924.

AMOS F. MOYER.